(12) United States Patent
Ebner et al.

(10) Patent No.: US 7,139,442 B2
(45) Date of Patent: Nov. 21, 2006

(54) TEMPLATE MATCHING APPLIED TO SELECTOR PLANES FOR MULTIPLE RASTER CONTENT (MRC) REPRESENTATION OF DOCUMENTS

(75) Inventors: Fritz F. Ebner, Redwood City, CA (US); Donald J. Curry, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 822 days.

(21) Appl. No.: 10/320,825

(22) Filed: Dec. 16, 2002

(65) Prior Publication Data

US 2004/0114832 A1    Jun. 17, 2004

(51) Int. Cl.
- G06K 9/32 (2006.01)
- G06K 9/62 (2006.01)
- G06K 9/00 (2006.01)

(52) U.S. Cl. ........................... 382/299; 382/209
(58) Field of Classification Search ........... 382/254, 382/256, 257, 233, 173, 176, 239, 302, 270, 382/209, 232, 299; 358/434; 345/426
See application file for complete search history.

(56) References Cited

U.S. PATENT DOCUMENTS

| | | | |
|---|---|---|---|
| 3,573,789 A | 4/1971 | Sharp et al. | 340/324 |
| 4,437,122 A | 3/1984 | Walsh et al. | 358/166 |
| 5,005,139 A | 4/1991 | Tung | 364/519 |
| 5,365,251 A | 11/1994 | Denber | 345/136 |
| 5,778,092 A * | 7/1998 | MacLeod et al. | 382/176 |
| 6,275,620 B1 * | 8/2001 | de Queiroz et al. | 382/270 |
| 6,324,305 B1 * | 11/2001 | Holladay et al. | 382/239 |
| 6,332,044 B1 | 12/2001 | Loce et al. | 382/269 |
| 6,334,001 B1 * | 12/2001 | de Queiroz et al. | 382/233 |
| 6,400,844 B1 * | 6/2002 | Fan et al. | 382/173 |
| 6,437,881 B1 * | 8/2002 | Baba et al. | 358/434 |
| 6,608,928 B1 * | 8/2003 | Queiroz | 382/173 |
| 6,832,007 B1 * | 12/2004 | Zhang et al. | 382/257 |
| 6,859,204 B1 * | 2/2005 | Curry et al. | 345/426 |
| 6,987,882 B1 * | 1/2006 | Curry et al. | 382/173 |
| 2004/0052427 A1 * | 3/2004 | Curry et al. | 382/256 |
| 2004/0096122 A1 * | 5/2004 | Curry et al. | 382/302 |
| 2004/0227758 A1 * | 11/2004 | Curry et al. | 345/426 |

* cited by examiner

*Primary Examiner*—Amir Alavi
(74) *Attorney, Agent, or Firm*—Oliff & Berridge, PLC

(57) ABSTRACT

A method and a system for separating an image signal into a set of image planes are disclosed. The system comprises a way to perform resolution conversion from low resolution to high resolution binary images either for synthetic or scanned imagery by using template matching with pattern replacement. More specifically, the invention applies resolution conversion to the selector plane of mixed raster content images. For selector planes in which edges are encoded (vs. region classification), template matching/pattern replacement works well, and does not affect halftoned regions, as they are not encoded in this image.

17 Claims, 6 Drawing Sheets

38

| 0 | 1 | 2 |
|---|---|---|
| 3 | 4 | 5 |
| 6 | 7 | 8 |

| 0 | 1 | 2 | 3 | 4 | 5 | 6 | 7 | 8 |
|---|---|---|---|---|---|---|---|---|

FIG. 4

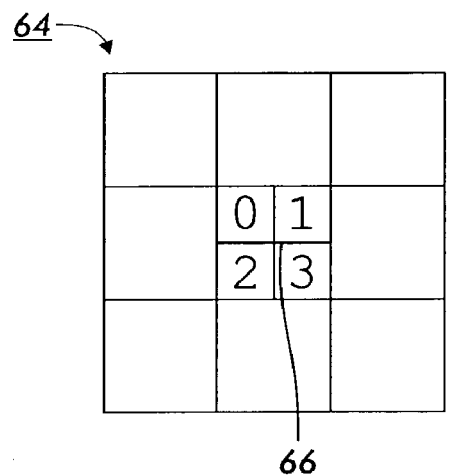
FIG. 6
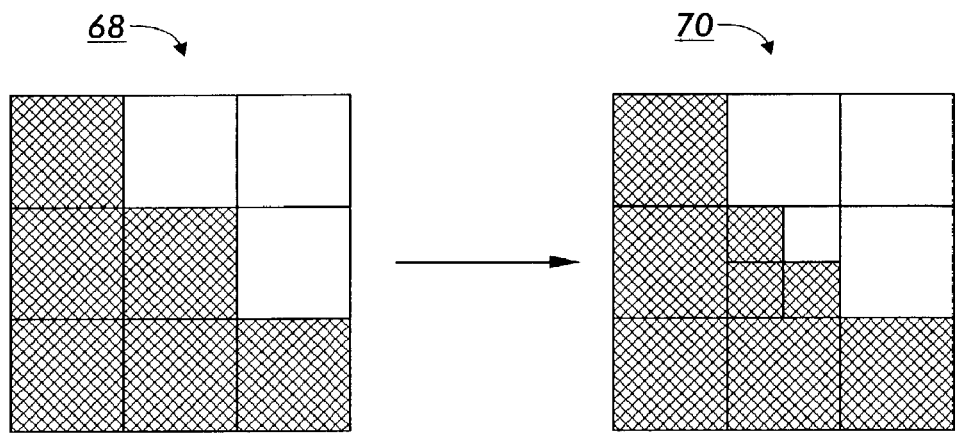
FIG. 7
| 0 | 0 | 1 |
|---|---|---|
| 0 | 1 | 1 |
| 1 | 1 | 1 |
FIG. 8

| 0 | 0 | 1 | 0 | 1 | 1 | 1 | 1 | 1 |
*FIG. 9*
*FIG. 10*
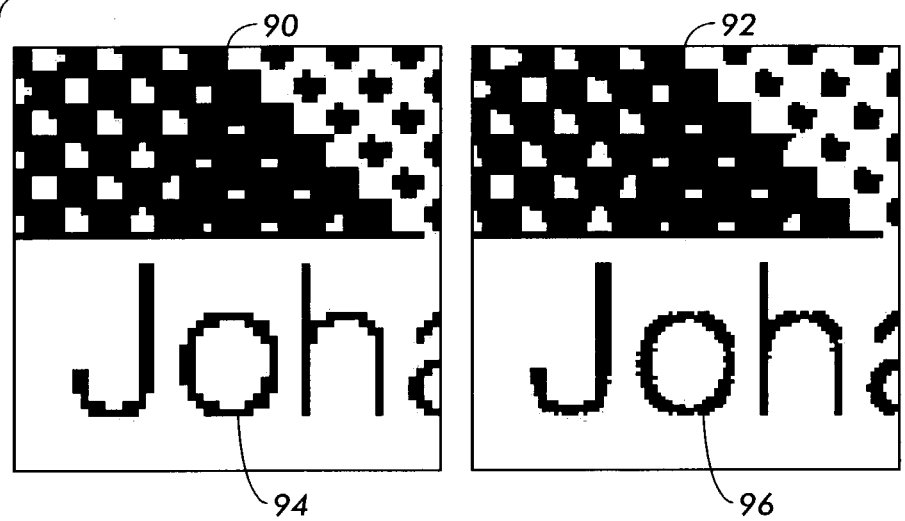
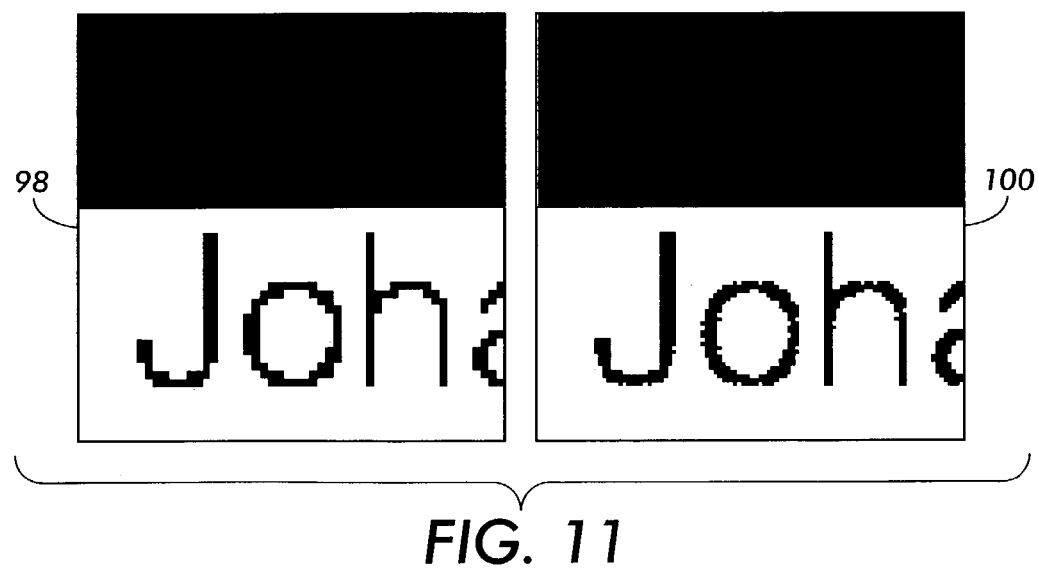
*FIG. 11*

TEMPLATE MATCHING APPLIED TO SELECTOR PLANES FOR MULTIPLE RASTER CONTENT (MRC) REPRESENTATION OF DOCUMENTS

BACKGROUND OF THE INVENTION

1. Field of the Invention

The present invention relates generally to methods and systems for segmenting digitally scanned documents into two or more planes, and more particularly to methods and systems for applying resolution conversion to the selector plane of Multiple Raster Content (MRC) representation of documents.

2. Description of Related Art

The MRC representation of documents is versatile. It provides the ability to represent color images and either color or monochrome text. The MRC representation enables the use of multiple "planes" for the purpose of representing the content of documents. The MRC representation is becoming increasingly important in the marketplace.

In an MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded in one of the planes, called the Selector plane. Following a careful separation, the various planes could be independently compressed using standard compression schemes (such as JPEG and G4) with good compression and high quality at the same time. A method and system for efficiently separating an image into a set of planes such that the advantages of the MRC representation can be fully exploited is described below.

SUMMARY OF THE INVENTION

A method and a system for separating an image signal into a set of image planes are disclosed. The system comprises a way to perform resolution conversion from low resolution to high resolution binary images either for synthetic or scanned imagery by using template matching with pattern replacement. More specifically, the invention applies resolution conversion to the selector plane of mixed raster content images. For selector planes in which edges are encoded (vs. region classification), template matching/pattern replacement works well, and does not affect halftoned regions, as they are not encoded in this image.

BRIEF DESCRIPTION OF THE DRAWINGS

The features and advantages of the present invention will become apparent from the following detailed description of the present invention in which:

FIG. 3 shows a template window employed by the present invention;

FIG. 4 shows a template pixel pattern employed by the present invention;

FIG. 6 shows four (4) placement pixels corresponding to the center pixel of a pixel window.

FIG. 7 illustrates an example replacement 2×2 pixel pattern based on the 3×3 neighborhood.

FIG. 8 illustrates an example template window.

FIG. 9 illustrates an example 9 bit address corresponding to said example template window of FIG. 8.

FIG. 10 illustrates resolution enhancement technology applied to a halftoned binary image. Note that the halftoned regions along with text are converted, which will lead to undesirable tone reproduction behavior FIG. 11 illustrates resolution enhancement technology applied to a selector plane of an MRC image. Note that there are no halftoned regions in this image, high frequency edge information.

DETAILED DESCRIPTION OF THE INVENTION

The present invention provides a method and a system for separating an image signal into a set of image planes. The image signal represents a digitally scanned document. The image planes are suitable for a Mixed Raster Content (MRC) representation of the digitally scanned document.

Figure 1:
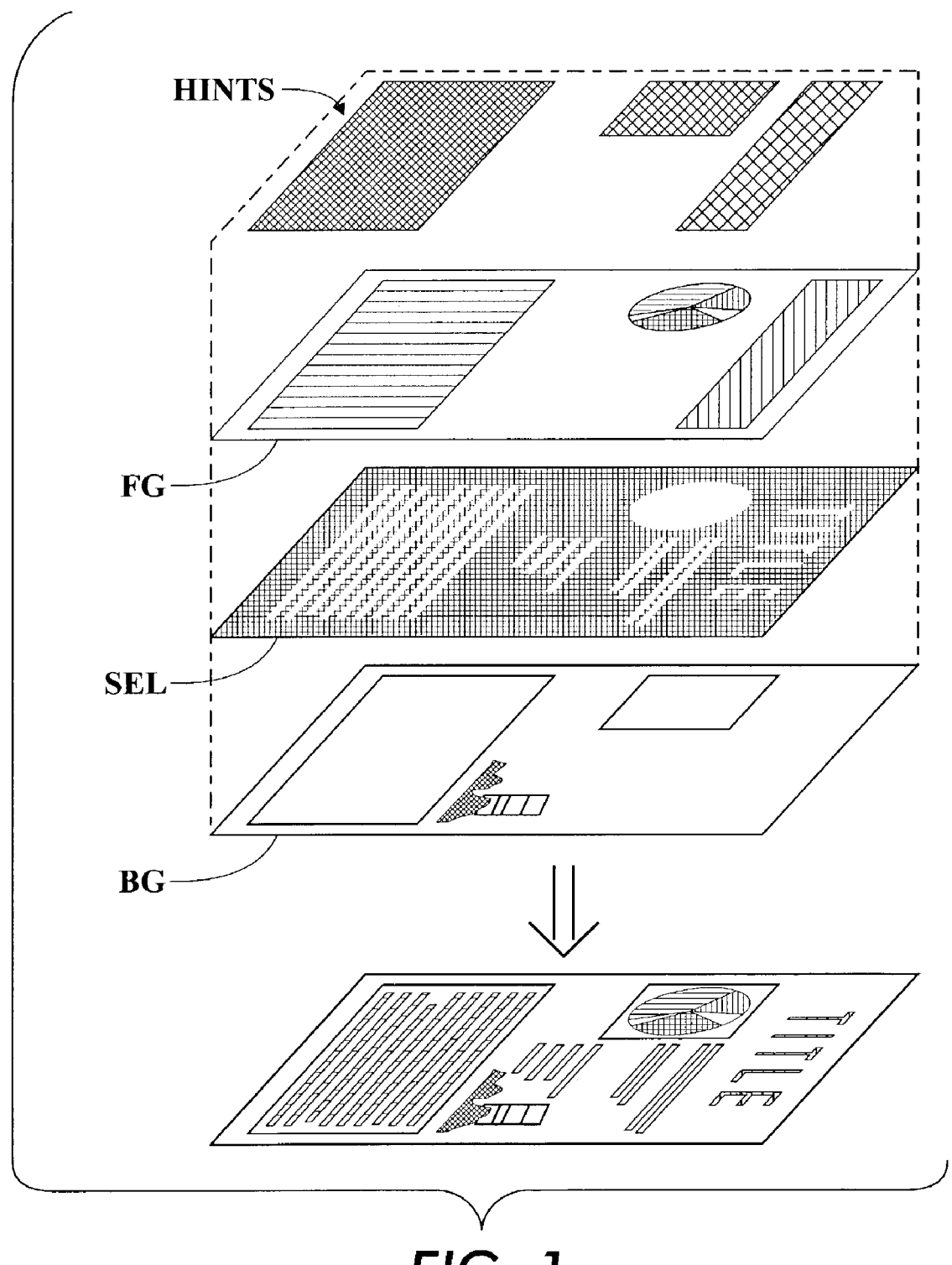
FIG. 1 illustrates the MRC structure for documents.

FIG. 1 shows the general MRC representation. The representation comprises up to four independent planes: Foreground, Background, Selector, and Rendering Hints. In the most general case, there could be multiple Foreground and Selector pairs at higher levels. However, in most applications, the representation is limited to three or four planes. The Background plane is typically used for storing continuous-tone information such as pictures and/or smoothly varying background colors. The Selector plane normally holds the image of text (binary) as well as other edge information (e.g., line art drawings). The Foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the Rendering Hints plane, which is used for communicating additional information about the content of the document. For example, the Rendering Hints plane may carry the ICC (International Color Consortium) color hints that identify the best color matching strategy for the various objects on the page.

The Foreground and Background planes are defined to be two full-color (L, a, b) planes. The Selector plane is defined as a binary (1-bit deep) plane. The Rendering Hints plane is typically restricted to either a one (1) or 8-bit plane. One exemplary MRC representation specifies that the Foreground and Background are to be JPEG compressed, and that the Selector plane is to be ITU-G4 compressed (standard Group 4 facsimile compression). The Rendering Hints plane is considered to be optional, but if one is used, a compression scheme similar to the Lempel-Ziv-Welch scheme may be used for its compression. In general, the Foreground, Background, Selector and Rendering Hints planes can all be at different resolutions, and they are not required to maintain the original source input resolution.

The method for assembling back a "segmented" MRC image from its components (i.e., planes) is by "pouring" the Foreground colors through the Selector plane "mask" on top of the Background plane, thus overwriting the previous content of the Background plane at these locations. In other words, the assembly is achieved by multiplexing between the Foreground and Background information on a pixel by pixel basis, based on the binary control signal of the Selector plane. For example, if the Selector value is 1, the content of Foreground is used; otherwise (i.e., for Selector value=0) the content of Background is used. The multiplexing operation is repeated on a pixel by pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 Selector sample per source pixel) in the Selector plane. Following a careful separation, the various planes could be independently compressed using standard compression schemes (such as JPEG and G4) with good compression and high quality at the same time.

Figure 2:
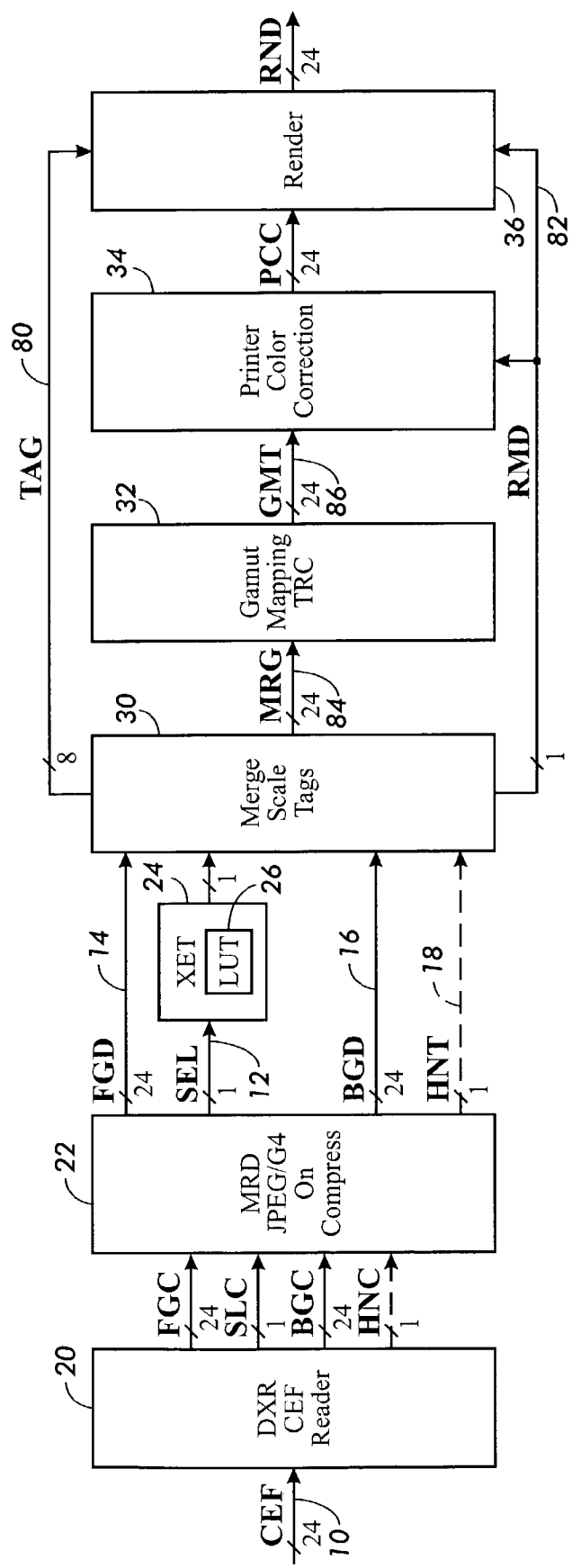
FIG. 2 shows the block diagram of the system of the present invention.

Referring to FIG. 2, there is shown the block diagram of the system of the present invention. The first module 20, is MRC Reader DXR, and is responsible for reading the MRC file, unpacking it, and separating the MRC data 10 into the individual planes. The module 20 reads in the compressed MRC data and produces the compressed planes: Foreground, Selector, Background, and Hint information (FGC, SLC, BGC, and HNC, respectively). The outputted planes are still compressed. By way of example only, the Foreground and Background may be JPEG compressed, while the Selector and Hint (when present) may be ITU-G4 compressed or LZW compressed. The Decompression Module MRD 22 is responsible for decompressing the various MRC planes. It reads in the compressed planes (FGC, SLC, BGC, and HNC) from the MRC Reader Module 20.

The Decompression Module 22 delivers the uncompressed outputs (FGD 14, SEL 12, BGD 16, and HNT 18, respectively) to the Merge Scale Module 30. Each plane is independently decompressed using the appropriate decompression algorithm. In addition, the Decompression Module 22 has the capability to rotate the incoming planes by multiples of 90 degrees (orthogonal rotations) to align them up with the desired print orientation. The rotation mechanism can leverage the file structure (e.g., tiles or stripes) to accomplish the rotation operation inline, without requiring large storage memory.

Figures 3, 4:
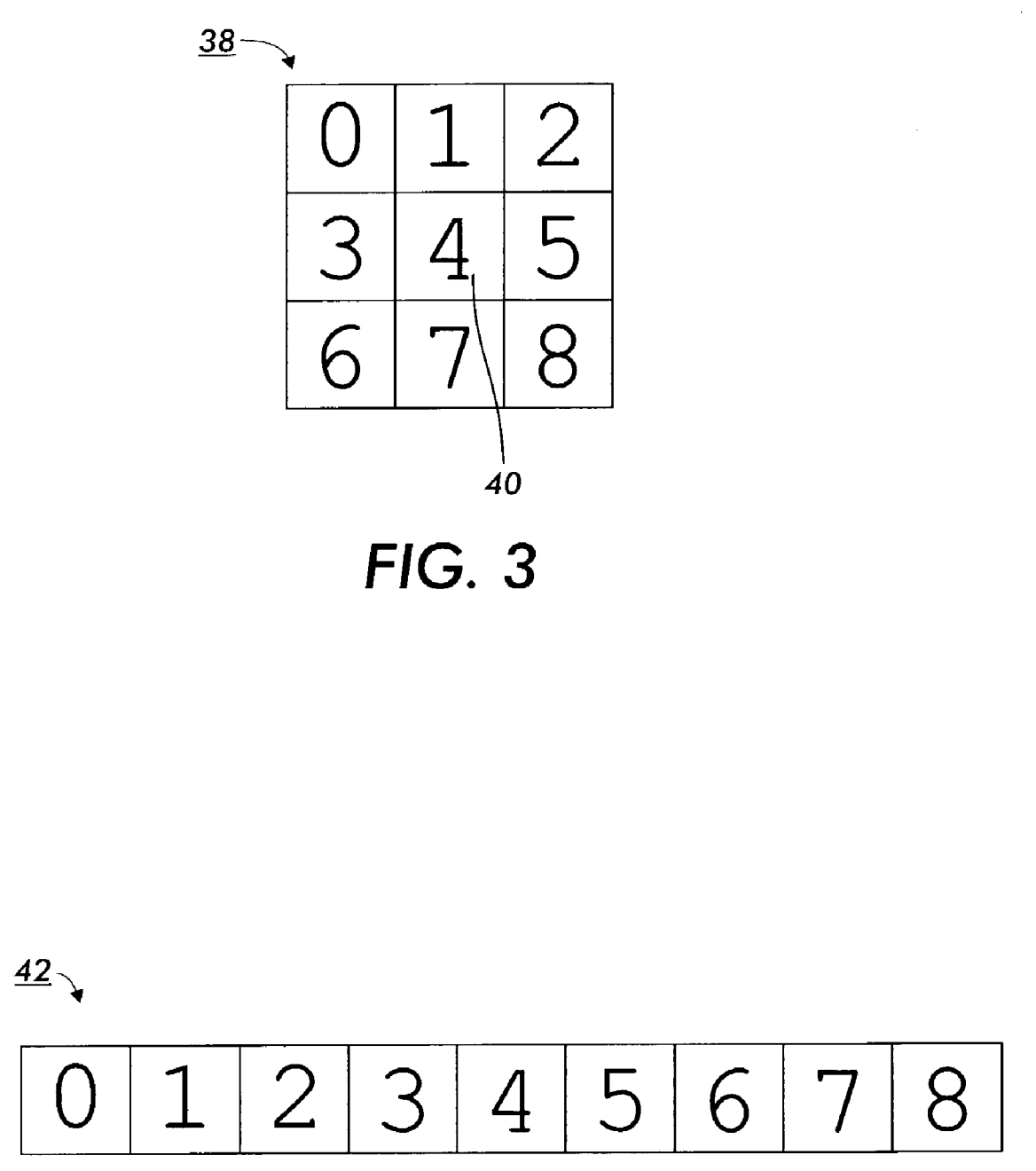
Figure 5:
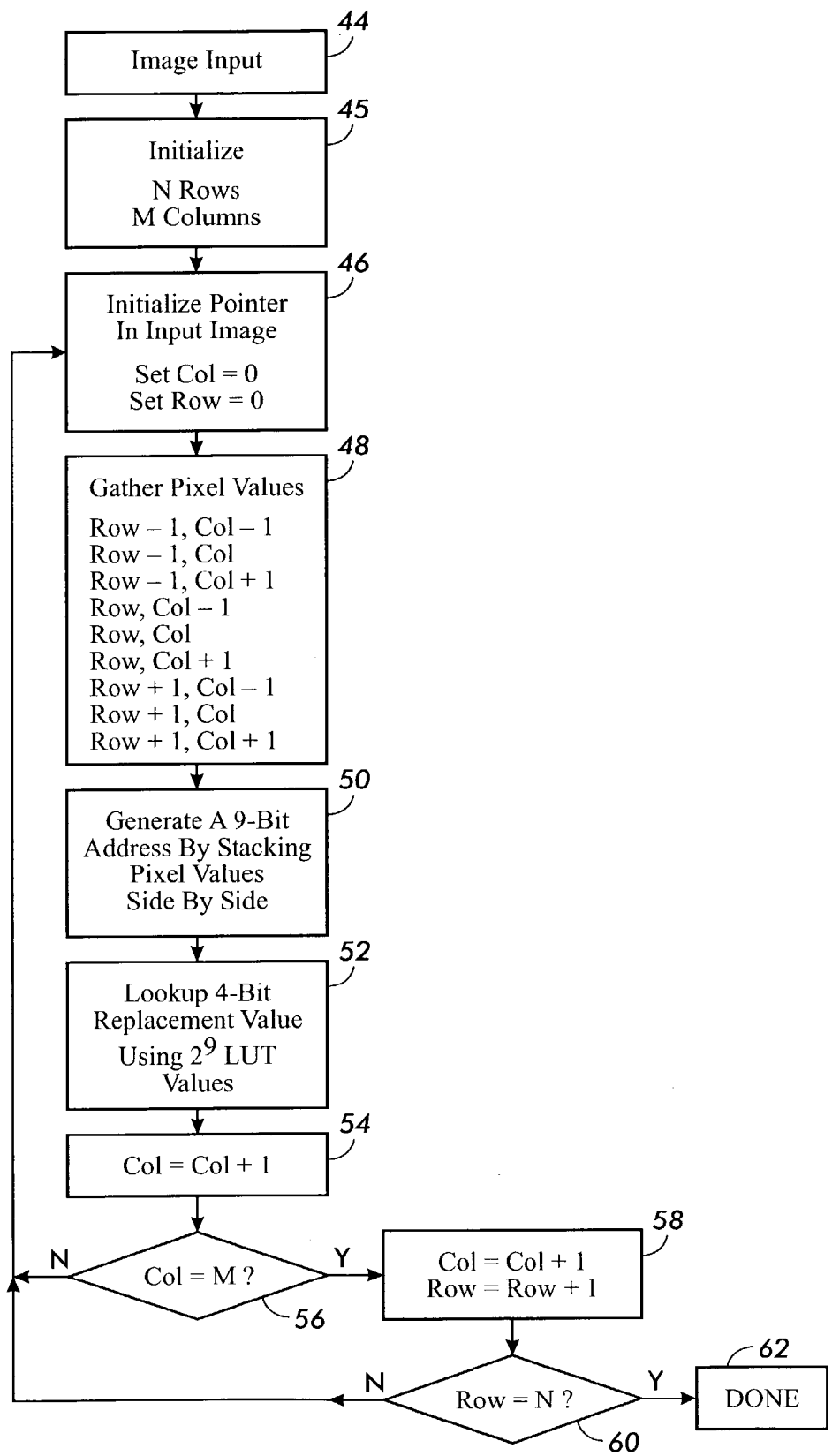
FIG. 5 illustrates a flowchart for applying resolution conversion to a selector plane in accordance with the present invention.

Referring to FIG. 5, a flowchart is illustrated for processing the selector input image to a resolution convertor 24 RC shown in FIG. 2. The input image 12 is in a binary matrix format and is indexed using pixel values of columns and rows. In the first step the number of columns and rows are initialized to the value of the matrix, whether it be a 3×3 or 5×5. By way of example only, the column is has a value of 3 and the row has a value of 3, as shown in step 45 and illustrated in FIG. 3. Therefore, FIG. 3 shows a 3×3 matrix pixel image wherein each column and row is designated by a pixel location numbered 1 through 8 respectively. In the next step 46, a pointer is initialized for the input image setting the pixel values designated by a column and row number to a value of zero. Next, referring again to FIG. 3, in step 48 each neighboring column and row pixel value around a center pixel (labeled 4 as shown in FIG. 3) is gathered for every row and column pixel location, 0, 1, 2, 3, 5, 6, 7 and 8, respectively. It should be noted that every row and column pixel value is represented by an associated binary bit of data (either 0 or 1).

Next in step 50, the bits gathered at various locations in the image is concatenated together to create a binary address 42 as shown in FIG. 4 for use with a look up table 26 (LUT) in step 50. More specifically, the algorithm uses the 8 nearest pixels in the neighborhood of the center pixel, as shown in FIG. 8. FIG. 8 also illustrates a template for a "gather pixels" block showing one instance of a pixel pattern. FIG. 9 illustrates the address generated by the template of FIG. 8. By way of example, the pixel pattern makes a binary address of 0 0 1 0 1 1 1 1, or Decimal 95 as shown in the pixel box template of FIG. 9. This address is used to look up replacement bit values in the look up table 26. In the preferred embodiment, when resolution doubling the selector plane, the replacement bit values represent a 2×2 block of pixels that are located at the center pixel (pixel 4) in FIG. 6. FIG. 7 illustrates an example of resolution conversion wherein block 68 is an example source image (selector plane of MRC image representation). Block 70 is an example of a resolution converted pixel pattern that will reduce the visibility of the jaggies in the resultant image. This process is repeated as shown in FIG. 5 for every pixel in the image as illustrated in steps 48–62. It cycles through the Image a row at a time in steps 58 and 60, and within each row, a column steps 54 and 56 at a time until the process is completed in step 62.

Turning once again to FIG. 2, the Merge Scale Tag Module 30 (MST) is responsible for merging the MRC planes back into a single image and scaling it to the desired device resolution. The output from the Merge Scale Module MST 30 includes the reconstructed full-color Lab image at the device resolution. In addition, the Merge Scale Module 30 generates a set of device tags TAG 80, also at the device resolution. These tags 80 could be used to guide the rendering engine, also referred to as the IOT device. For example, the tags 80 can be used to communicate the precise location of (high-precision) edges to the rendering engine. It is important to note that although the tags 80 are used for driving some of the IOT capabilities, the actual representation is quite generic and as much device-independent as possible.

In addition to the tags 80 above, the Merge Scale Tag Module 30 (MST) also generates a binary Rendering Mode signal 82 (RMD), which is delivered to the Printer Color Correction 34 and Render 36 modules. The binary Rendering Mode signal 82 is typically used for switching among different rendering screens and switching between corresponding color tables. The Rendering Mode signal 82 is also scaled to the desired device resolution.

Referring once again to FIG. 2, the remainder of the back-end pipeline after the Merge Scale Module 30 is will now be described. The Gamut Enhance Module 32 (GMT) applies 3 independent Tone Reproduction Curves (TRC) to each of the color components of the input image. The implementation is done via three independent and fully programmable 1D lookup tables (not shown). The input to the Gamut Enhance Module is the merged output MRG 84 from the Merge Scale Tag Module 30. The output is the gamut-mapped signal 86 GMT.

The Printer Color Conversion Module 36 converts the color space of the output from the Gamut Enhance Module 32 (GMT) from the internal Lab representation to the device CMYK colorants. The Printer Color Conversion Module 34 applies a tetrahedral interpolation in 3D to 4D space, followed by four 1D lookup tables for device linearization. In addition, as indicated above, the Rendering Mode signal 82

RMD from the Merge Scale Tag Module 30 can be used to switch color tables on the fly, on a pixel-by-pixel basis.

Finally, the Rendering Module 36 converts the contone CMYK input from the Printer Color Conversion Module 34 to the binary data needed to drive the specific marking device, such as a Fax or printer. Obviously, the Rendering Module 36 is device-specific, as must be for driving a particular marking engine. It should be noted that the Rendering Mode signal 82 RMD from the Merge Scale Tag 30 can be used to switch between different rendering screens (threshold arrays), while the tags created by TAG 80 the Merge Scale Tag Module 30 can be used to render high precision edges.

Referring to FIG. 10, the images comprise a source image 90 and 94, and a processed image 92 and 96 using a 5×5 XET template to double the resolution. The images are binary separations of a colorant (e.g. black). Note that the text has been modified to have smoother (not necessarily optimal) edges. Additionally, the halftoned region has been affected. This affect on the halftone region is uncontrollable, and will lead to degraded image quality. Referring to FIG. 11, the similar region from a selector plane form an image coded in MRC format is processed. Source image 98 and the processed image 100 show that only the edge information from the MRC file is affected by the resolution conversion, so the image quality of the file is not degraded as in the example of FIG. 10. The invention has the added advantage of being applied to ALL edges and ALL colors in the image without the need to apply several times to separations.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for resolution conversion of an image comprising:
    reading data in a multiple raster content file;
    separating said multiple raster content data into a plurality of planes from said multiple raster content file in which one plane is a selector plane; and
    applying resolution conversion to said selector plane of said multiple raster content,
    wherein applying resolution conversion increases the resolution of said selector plane.

2. The method according to claim 1 wherein said selector plane is in binary format.

3. The method according to claim 1 wherein said selector plane has multiple bits per pixels.

4. The method according to claim 1 wherein said plurality of planes define background and foreground planes which are at a lower resolution than said selector plane.

5. The method according to claim 1 wherein said plurality of planes define background and foreground planes wherein each background and foreground planes have multiple bits per pixel.

6. The method according to claim 1 wherein said plurality of planes define background and foreground planes which are at a higher resolution than said selector plane.

7. A method for resolution conversion of an image comprising:
    retrieving a selector plane from a multiple raster content data file; and
    increasing the resolution of said selector plane by applying resolution conversion to said selector plane of said multiple raster content.

8. The method according to claim 7 wherein said selector plane is in binary format.

9. The method according to claim 7 wherein said selector plane has multiple bits per pixels.

10. The method according to claim 7 wherein said plurality of planes define background and foreground planes which are at a lower resolution than said selector plane.

11. The method according to claim 7 wherein said plurality of planes define background and foreground planes wherein each background and foreground planes have multiple bits per pixel.

12. The method according to claim 7 wherein said plurality of planes define background and foreground planes which are at a lower resolution than said selector plane.

13. A method for resolution conversion of an image comprising:
    reading data in a multiple raster content file;
    separating said multiple raster content data into background, foreground and selector planes; and
    applying resolution conversion to said selector plane of said multiple raster content,
    wherein applying resolution conversion increases the resolution of said selector plane.

14. The method according to claim 13 wherein said selector plane is in binary format.

15. The method according to claim 13 wherein said selector plane has multiple bits per pixels.

16. The method according to claim 13 wherein said background and foreground planes which are at a higher resolution than said selector plane.

17. The method according to claim 13 wherein said background and foreground planes wherein each background and foreground planes have multiple bits per pixel.

* * * * *